United States Patent
Fledersbacher et al.

(10) Patent No.: US 8,230,683 B2
(45) Date of Patent: Jul. 31, 2012

(54) TURBOCHARGER INCLUDING VARIABLE GEOMETRY TURBINE WITH IMPROVED GUIDE ELEMENT AND OPERATING FORK

(75) Inventors: Peter Fledersbacher, Stuttgart (DE); Torsten Hirth, Rutesheim (DE)

(73) Assignee: Daimler AG, Stuttgart (DE)

( * ) Notice: Subject to any disclaimer, the term of this patent is extended or adjusted under 35 U.S.C. 154(b) by 691 days.

(21) Appl. No.: 12/387,144

(22) Filed: Apr. 28, 2009

(65) Prior Publication Data

US 2009/0277171 A1 Nov. 12, 2009

Related U.S. Application Data

(63) Continuation-in-part of application No. PCT/EP2007/009399, filed on Oct. 30, 2007.

(30) Foreign Application Priority Data

Nov. 2, 2006 (DE) .......................... 10 2006 051 628

(51) Int. Cl.
   *F02B 37/10* (2006.01)
(52) U.S. Cl. ........... 60/602; 60/603; 60/605.1; 415/157; 415/158
(58) Field of Classification Search .................. 60/602, 60/603, 605.1; 415/167, 114, 115, 58.6, 415/77, 206, 157–158; 416/183, 223 R, 416/203, 189, 198 R; *F02B 37/10*
See application file for complete search history.

(56) References Cited

U.S. PATENT DOCUMENTS

| | | | | | |
|---|---|---|---|---|---|
| 2,861,774 | A | * | 11/1958 | Buchi | 415/17 |
| 4,776,168 | A | * | 10/1988 | Woollenweber | 60/602 |
| 5,214,920 | A | * | 6/1993 | Leavesley | 60/602 |
| 5,231,831 | A | * | 8/1993 | Leavesley | 60/602 |
| 2006/0117749 | A1 | * | 6/2006 | Sumser | 60/599 |
| 2006/0233640 | A1 | * | 10/2006 | Lombard et al. | 415/159 |
| 2007/0125082 | A1 | * | 6/2007 | Sumser et al. | 60/599 |

FOREIGN PATENT DOCUMENTS

| | | |
|---|---|---|
| DE | 198 16 645 | 10/1999 |
| GB | 2 408 779 | 6/2005 |
| JP | 01 179133 | 12/1989 |
| JP | 2009-535016 | 10/2009 |
| WO | WO2004/007914 | 1/2004 |
| WO | WO 2006007888 A1 * | 1/2006 |
| WO | WO 2006/061588 | 6/2006 |

* cited by examiner

*Primary Examiner* — Quyen Leung
*Assistant Examiner* — Michael Andrews
(74) *Attorney, Agent, or Firm* — Klaus J. Bach

(57) ABSTRACT

In an exhaust gas turbocharger turbine for an internal combustion engine having a housing including a turbine wheel rotatably supported in the housing, wherein the housing has an exhaust gas flow guide section including an exhaust gas flow control arrangement with a guide vane structure for directing exhaust gas onto the turbine rotor, an adjustment mechanism with an axially movable control slide is provided which is movable by an operating fork which is slidably supported on a guide element and engages the control slide at opposite sides so as to prevent cogging of the movable control slide during movement into, and out of, the exhaust gas flow guide section.

6 Claims, 2 Drawing Sheets

TURBOCHARGER INCLUDING VARIABLE GEOMETRY TURBINE WITH IMPROVED GUIDE ELEMENT AND OPERATING FORK

This is a Continuation-in-Part Application of pending international patent application PCT/EP2007/009399 filed Oct. 30, 2007 and claiming the priority of German patent application 10 2006 051682861 filed Nov. 2, 2006.

BACKGROUND OF THE INVENTION

The invention relates to an exhaust gas turbocharger turbine for an internal combustion engine, the turbocharger turbine including a rotor having a shaft rotatably supported in a housing provided with an adjustable inlet vane structure and an operating fork and being arranged in an exhaust duct of the internal combustion engine.

DE 198 16 645 B4 discloses an exhaust gas turbocharger with a housing including an exhaust gas guide section and a turbine wheel rotatably supported in the housing. The turbine wheel is connected in a rotationally fixed manner to the shaft which has a given axis of rotation. The turbine wheel is impinged upon by exhaust gases from an internal combustion engine during operation and is rotated thereby. The inlet vane structure forms an exhaust gas flow control structure for changing the exhaust gas flow direction and the flow volume to a turbine wheel. The flow control structure is positioned in the exhaust gas inlet flow guide passage and is adjustable so that an efficiency of the exhaust gas turbocharger can be as high as it can possibly be achieved. The flow control structure is arranged in a displaceable manner, and the position thereof is controlled depending on a particular operating point of the internal combustion engine. The flow control device includes an axial slide member which is axially displaceable in the direction of the axis of rotation of the turbine. The directing device includes an adjusting mechanism for displacing the axial slide member. The adjusting mechanism has an adjusting fork with end sections, wherein the end sections are cam-shaped. The end sections are received in recesses provided at the circumference of the axial slide, whereby an engagement of the adjusting fork in the recesses is realized. The adjusting fork is pivotally supported and movable by means of a pneumatic cylinder. Movement of the adjusting fork is provided for by a pneumatic cylinder. For the axial displacement of the axial slide, the adjusting fork is rotated so that the end sections carry out a rotational movement in the recesses. However, canting of the ends of the fork in the recesses and thereby a failure of the exhaust gas turbocharger cannot be excluded.

It is the principal object of the present invention to provide an exhaust gas turbocharger which permits an adjustment of the axial slide in every operating range with a simple and economical adjusting mechanism.

SUMMARY OF THE INVENTION

In an exhaust gas turbocharger turbine for an internal combustion engine having a housing including a turbine wheel rotatably supported in the housing, wherein the housing has an exhaust gas flow guide section including an exhaust gas flow control arrangement with a guide vane structure for directing exhaust gas onto the turbine rotor, an adjustment mechanism with an axially movable control slide is provided which is movable by an operating fork which is slidably supported on a guide element and engages the control slide at opposite sides so as to prevent cogging of the movable control slide during movement into, and out of, the exhaust gas flow guide section.

Translational movement of the operating fork is transmitted to the axial slide for the displacement of the axial slide in such a way that, a tilting movement of the axial slide in a plane including the axis of rotation is excluded. The adjusting fork further represents an economical lightweight construction.

In an advantageous embodiment of the invention, the guide element is positioned in an opening of the adjusting fork for secure guiding, the opening being arranged in a guiding section of the adjusting fork.

In a preferred embodiment, a contact area with a certain length or area is formed between the adjusting fork and the guiding element. For reducing the wear and for ensuring a continuous operation of the exhaust gas turbocharger, a ratio larger than 2 between the length and the diameter of the guide element is advantageous.

In another embodiment, the guide element is supported in a contour sleeve at its side remote from the turbine wheel, and in the exhaust gas conducting section at its side facing the turbine wheel, whereby a distortion of the guiding element with high temperature fluctuation during operation can be avoided.

Preferably, the guide element and the opening are cylindrical for an economic manufacture and for simple mounting.

The adjusting fork and the axial slide may have first and second body contacts arranged at opposite sides of the slide symmetrically to a slide axis of the guide element, whereby tilting or cogging of the axial slide can be avoided.

Advantageously, the guiding section may have a second recess, in which a first lever end is engaged by means of which the axial displacement can be initiated. A movement initiating the axial displacement can be changed to a translational movement by means of the second recess whereby any cogging inclination of the axial slide can additionally be reduced. The second recess is preferably oriented transversely to the axis of rotation.

Preferably, the first lever end is formed in the shape of a slide roller, whereby chances of binding during a transfer of the adjusting force from the adjusting lever to the guide ring can be reduced.

The invention will become more readily apparent from the following description of particular embodiments thereof on the basis of the accompanying drawings.

DESCRIPTION OF A PARTICULAR EMBODIMENT OF THE INVENTION

Figure 1:
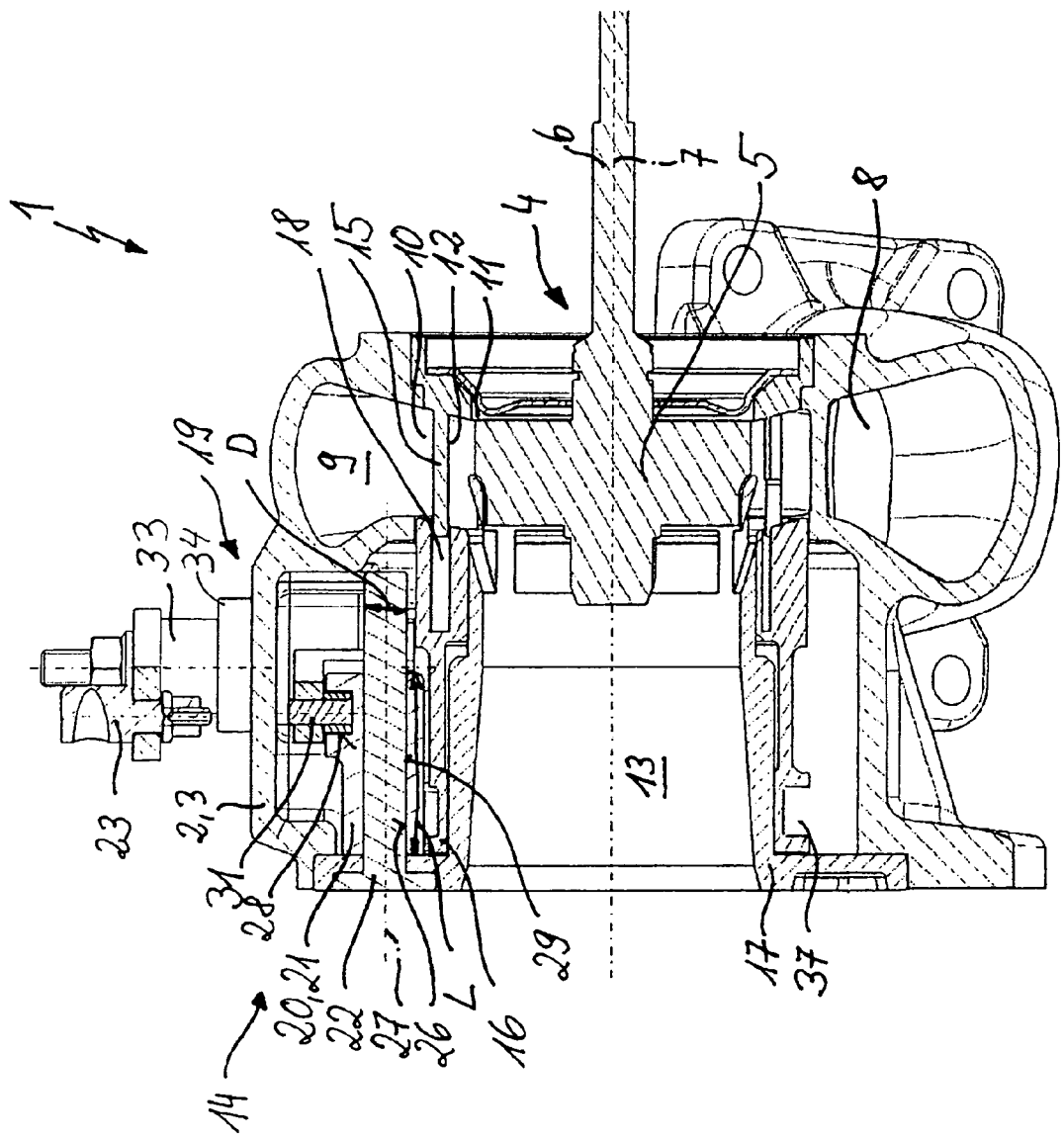
FIG. 1 shows an exhaust turbine with an exhaust gas conducting section of an exhaust gas turbocharger according to the invention in a longitudinal cross-sectional view including a flow control slide for controlling the exhaust gas flow to the turbine.

Modern internal combustion engines often include an exhaust gas turbocharger 1 which has a housing 2, which comprises an air compression section (not shown), an exhaust gas section 3 through which exhaust gas is conducted and a bearing section disposed between the air compression and the exhaust gas section 3.

The exhaust gas turbocharger 1 has a rotor 4, which comprises a compressor wheel for compressing combustion air, a turbine wheel 5 for expanding exhaust gas, and a shaft 6 connecting the turbine wheel 5 to the compressor wheel in a rotationally fixed manner and having an axis of rotation 7. The shaft 6 is rotatably supported by the bearing section of the exhaust gas turbocharger 1, which is disposed between the air conducting section and the exhaust section 3.

The gas conducting section 3 includes an inlet channel 8 for guiding the exhaust gas into the exhaust gas conducting section 3. The inlet channel 8 directs the exhaust gas to the turbine wheel 5 for rotation thereof during the operation of the internal combustion engine. The inlet channel 8 is preferably arranged in a plane extending normal to the rotational axis 7.

A spiral channel 9 is arranged in the exhaust gas conducting section 3 downstream of the inlet channel 8, which serves for providing a rotation-symmetrical flow of the exhaust gas to the turbine wheel 5. An inflow passage 10 is positioned in the exhaust gas conducting section 3 downstream of the spiral channel 9, which is generally formed for controlling the flow of the exhaust gas to the turbine wheel 5. The spiral channel 9 is further formed as transition channel between the inlet channel 8 and the inflow passage 10. A wheel chamber 11 is formed in the exhaust gas conducting section 3 downstream of the inflow passage 10, for accommodating the turbine wheel 5. The inflow passage 10 has an orifice cross section 12 adjacent the wheel chamber 11. An exit channel 13 is arranged in the exhaust gas conducting section 3 downstream of the wheel chamber 11.

So that the highest exhaust gas turbocharger efficiency can be achieved also during low loads and low speed operation of the internal combustion engine, as well as during high speed operation of the internal combustion engine, the exhaust gas flow to the turbine wheel 5 can be controlled by means of an adjustable control device 14, which is arranged in the exhaust gas conducting section 3.

As shown in FIG. 1, the control device 14 comprises a guide vane ring 15, an annular axial slide 16, and a contour sleeve 17, which forms an exhaust gas exit channel 13. The guide vane ring 15, the axial slide 16 and the contour sleeve 17 are arranged coaxially with the shaft 6. The contour sleeve 17 is fixed in the exhaust gas conducting section 3.

The guide vane ring 15 is arranged in the inflow passage 10 partially surrounding the turbine wheel 5. The axial slide 16 has an annular recess 18 facing the guide vane ring 15, in which recess the guide vane ring 15 can be accommodated. The inflow passage 10 has an orifice cross section 12 which can be adjusted in its size by means of the axial slide 16. The orifice cross section 12 is preferably small during low load and/or low speed operation of the internal combustion engine and large during high load and/or high speed operation of the internal combustion engine.

The control device 14 includes an adjusting mechanism 19 which comprises an operating fork 20 with a guide section 21, a guide element 22, and an operating lever 23. A force acting on the operating lever 23 for the displacement thereof can be initiated electrically, mechanically, or hydraulically.

The operating fork is U-shaped. A first arced fork arm 24 and a second arced fork arm 25 are connected in a fixed manner to the guide section 21. The first fork arm 24 and the second fork arm 25 are positioned in a symmetrical manner opposite to one another and extend in a convex manner from the guide section 21 arranged between the first fork arm 24 and the second fork arm 25.

The guide section 21 has an opening 26 with a guide axis 27 extending through the guide section 21. The axis 27 extends parallel to the axis of rotation 7 of the rotor shaft 6. The guide section 21 has a groove-shaped recess 28 which extends transversely to the guide axis 27 and faces away from the axial slide 16. For the secure guiding of the adjusting fork 20, the guide element 22 has a cross-section formed complementary to the opening 26. A symmetrical cross-section is preferably chosen.

The guide element 22 is preferably cylindrical and has an effective diameter D. For ensuring the secure guiding, the guide element 22 is firmly connected to the contour sleeve 7 at its side facing away from the turbine wheel 5. At its end near the turbine wheel 5, the guide element 22 is only supported, for example slidably, by the exhaust gas conducting section 3, whereby a distortion of the guide element 22 due to temperature fluctuations can be avoided.

The operating fork 20 is supported on the guide element 22, as the guide element 22 extends into the preferably cylindrical opening 26. A contact 29 with the length L is formed between the guide element 22 and the adjusting fork 20. For avoiding tilting of the operating fork 20, the effective diameter D of the guide element 22 is preferably chosen in such a manner that the length L is larger than the effective diameter D, especially a ratio L/D larger than 2 is selected between the length L and the effective diameter D.

The adjusting lever arrangement 23 has a first lever arm 30 with a lever end 31 and a second lever arm 32. The first lever arm 30 and the second lever arm 32 are connected in a fixed manner opposite to one another by means of a connecting rod 33, the lever end 31 being arranged facing the groove-shaped recess 28. The operating lever arrangement 23 is mounted rotatably in the exhaust gas conducting housing section 3 so that its position is adjustable by means of the connecting rod 33 rotatably supported in a bush 34.

The lever end 31 is provided with a structure extending into the groove-shaped recess 28, wherein it is firmly guided. The lever end 31 is preferably in the form of a slide roller, whereby wear and friction during operation can be reduced.

Figure 2:
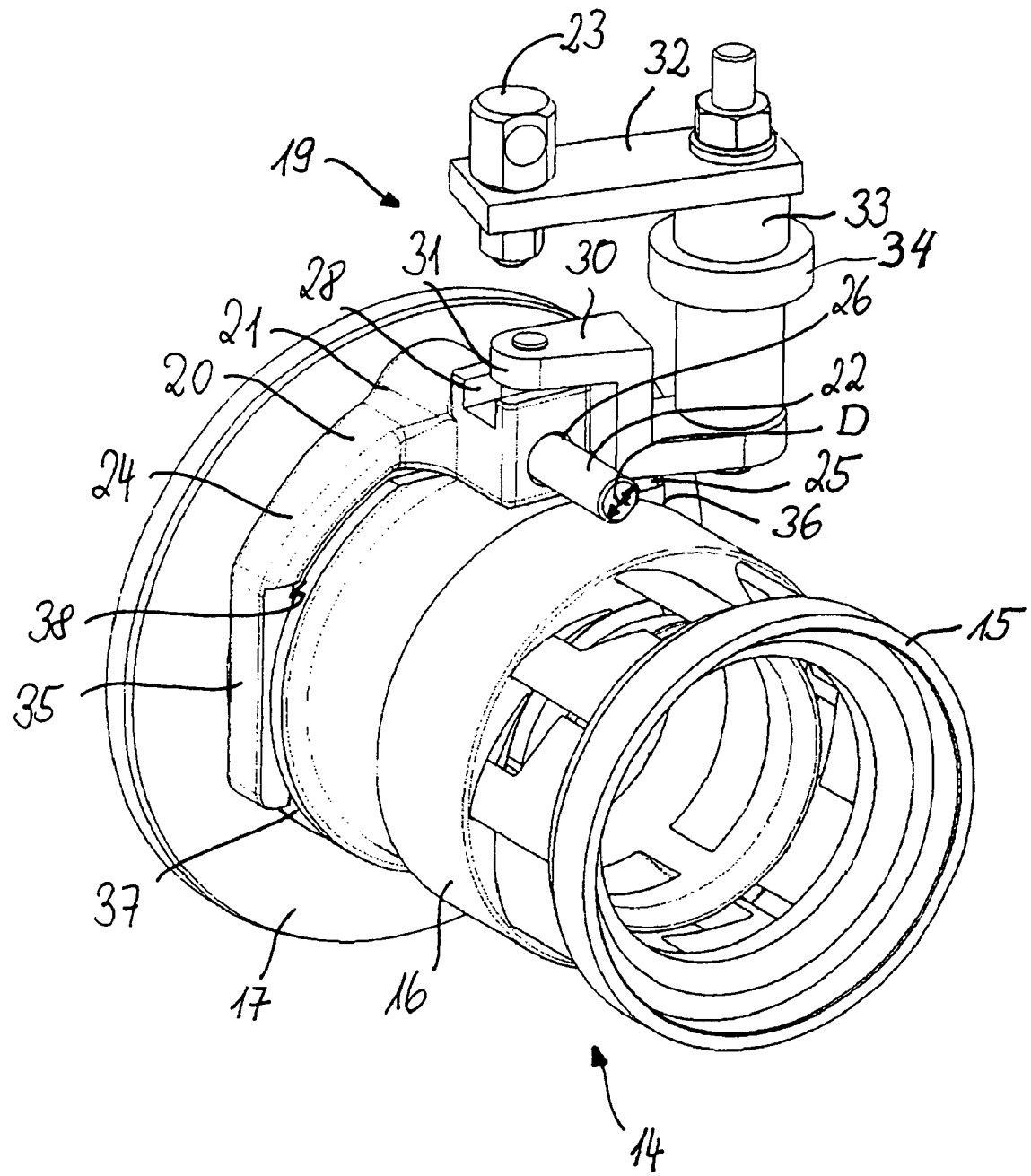
FIG. 2 shows, in a perspective view, an adjusting mechanism for operating the exhaust gas flow control slide.

As shown in FIG. 2, the operating fork 20 engages the axial slide 16, wherein a first end section 35 of the first fork arm 24 extending away from the guide section 21, and a second end section 36 of the second fork arm 25 extending away from the guide section 21, are received in an annular recess 27 extending around the axial slide 16. A first body contact is formed between the annular recess 27 and the first contact surface 28 of the first end section 35 in the recess 37. So as to counteract a tilting movement of the axial slide 16, a second body contact is established between the annular recess 37, so that a symmetrical arrangement of the first body contact and the second body contact with respect to the axis 7 of movement of the slide 16 is achieved.

The annular recess 37 is preferably formed complementary to the first end section 35 and to the second end section 36, wherein tight frictional body contact between the third recess 37 and the first end section 35 and the second end section 36 provides for a play-free engagement of the axial slide 16 in the adjusting fork 20.

The first fork arm 24 and the second fork arm 25, respectively, may also have, facing the axial slide 16, a groove-shaped recess, in which an annular or partially annular ring may be received, which is fixedly connected to the axial slide 16 and shaped complementary to the cross-section of the groove-shaped recess in the fork arms 24, 25 in which it is received.

In a further alternative embodiment, the adjusting fork 20 may be formed integrally with the axial slide 16, wherein the adjusting fork 20 and the axial slide 16 respectively, have for example a fixed connection at the first and second body contacts.

For positioning the axial slide 16, an operating force acting on the control lever 32 is applied by the actuator 23. Since the control lever 32 is mounted in a pivotable manner, the lever arm 30 carries out a pivot movement due to its fixed connection with the control lever 32. This rotational movement is changed into a translation movement of the adjusting fork 20 by means of the structure engaging the lever end 31. The adjusting fork 20 is axially displaced along the guide element 22 in the direction of the guide axis 27 or in the direction of the axis of rotation 7. The axial slide 16 thereby carries out an axial movement due to the first body contact and the second body contact with the adjusting fork 20.

What is claimed is:

1. An exhaust gas turbocharger turbine for an internal combustion engine having a housing (2) including a turbine rotor structure (4) with a turbine rotor (5) having a shaft (6) supported in the housing (2) rotatably about an axis of rotation (7), said housing (2) including an exhaust gas flow guide section (3) surrounding the turbine rotor (5), the exhaust gas guide section (3) including an exhaust gas flow Control arrangement with a guide vane structure (15) for directing exhaust gas onto the turbine rotor (5), a flow control arrangement (14) and an adjustment mechanism (19) with an axially movable control slide (16) engaged by an operating fork (20), a guide element (22) extending parallel to the axis of rotation (7) of the rotor (5) said operating fork (20) having an opening (26) through which said guide element (22) extends for slidably supporting the operating fork (20), the operating fork (20) having a guide section (21) with a groove (28) into which a lever end (31) of an operating lever (32) extends for the conversion of pivot movement of the operating lever (32) to a translatory movement for the axial movement of the operating fork (20).

2. The turbine as defined in claim 1, wherein the guide element (22) and the guide section (21) of the operating fork (20) are in contact with each other in the opening (26) over a length (L) and the guide element (22) has an effective diameter (D), wherein the ratio L/D is greater than 2.

3. The turbine as defined in claim 1, wherein the guide element (22) is firmly supported, at its end remote from the turbine rotor (5), by a contour sleeve (17) surrounding a turbine exhaust channel (13) and, at its end next to the turbine rotor (5), on, and relatively movable to, the exhaust gas guide section (3) of the housing (2) for accommodating thermal expansion and contraction of the contour sleeve (17).

4. The turbine as defined in claim 1, wherein the guide element (22) and the opening (26) are cylindrical.

5. The turbine as defined in claim 1, wherein the operating fork (20) and the axially movable control slide (16) include first and second contact areas which are arranged symmetrically with respect to the axis (27) of the guide element (22).

6. The turbine as defined in claim 1, wherein the lever end (31) is provided with a slide roller to provide for friction-free movement of the lever end (31) in the groove (28).

* * * * *